3,012,654
GYRATORY VIBRATING DEVICE
Kenneth M. Allen and Chester H. Harper, Newberg, Oreg., assignors to Allen-Harper, Inc., Portland, Oreg., a corporation of Oregon
Filed Nov. 17, 1958, Ser. No. 774,224
13 Claims. (Cl. 198—220)

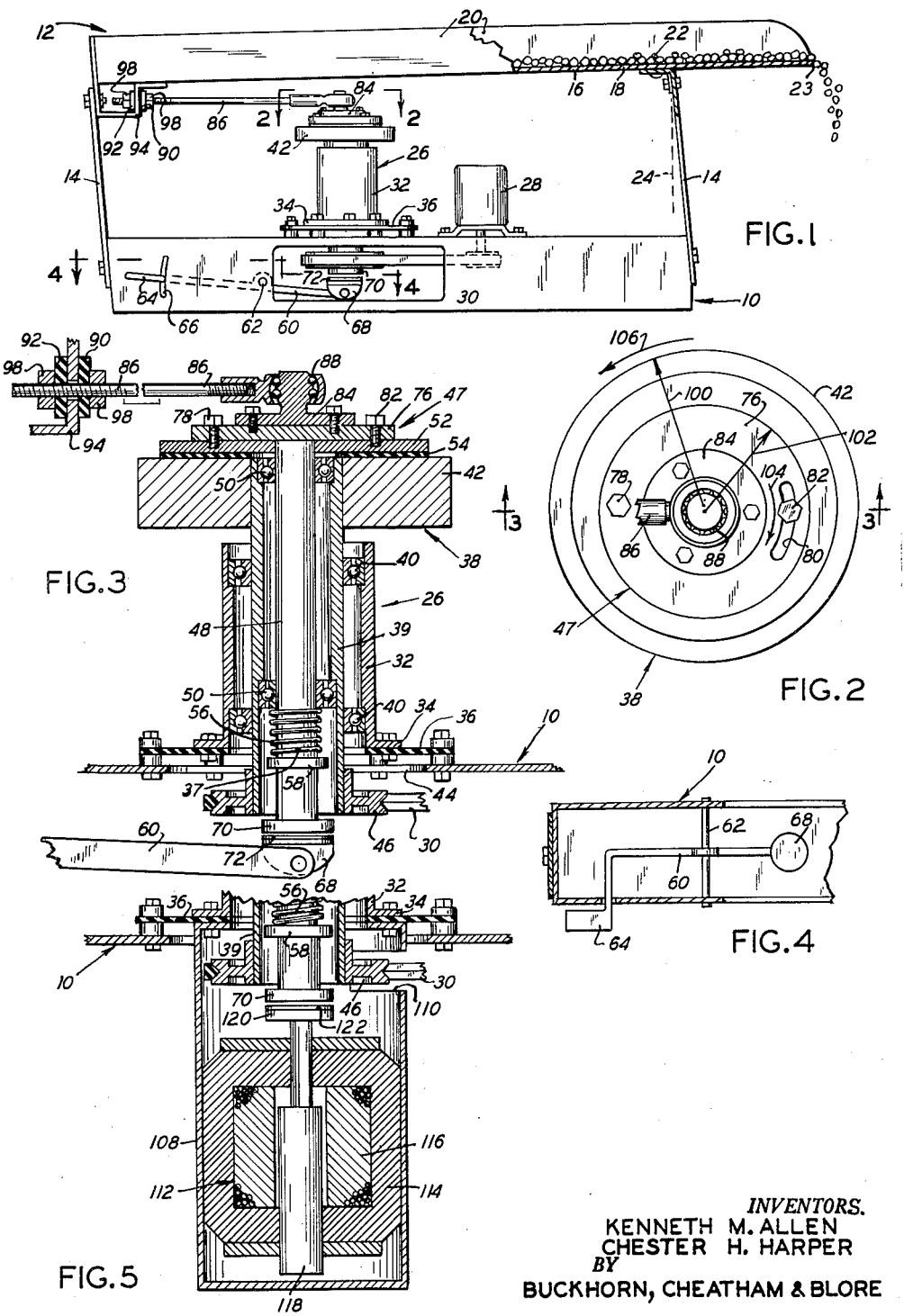
Dec. 12, 1961   K. M. ALLEN ET AL   3,012,654
GYRATORY VIBRATING DEVICE
Filed Nov. 17, 1958
INVENTORS.
KENNETH M. ALLEN
CHESTER H. HARPER
BY
BUCKHORN, CHEATHAM & BLORE
ATTORNEYS

United States Patent Office 3,012,654
Patented Dec. 12, 1961

This invention relates to a gyratory vibrating device, and more particularly to a gyratory vibrator in which a rotor has an eccentric connection to a vibrated member with respect to the actual axis of rotation of such rotor and such rotor is mounted for limited pivotal motion of such axis in any direction about a pivotal point in such axis in a manner which enables forces applied to such rotor through such eccentric connection to be balanced by inertial forces resulting from accelerations of the mass of such rotor and parts associated therewith.

Vibrators of various types are employed extensively in the prior art for vibrating conveyors, feeding devices, screens, etc. Electrically operated magnetic vibrating devices are in common use and have the advantage that they can be easily and quickly stopped and started but, in general, such vibrators are extremely noisy and also quite critical in adjustment. Mechanical vibrators including rotary devices embodying eccentrics, or unbalanced weights, or a combination of the two are also extensively employed but most of such devices have disadvantages in that it is difficult to quickly start and stop the vibrating action and, in many cases, such devices pass through critical speeds of excessive vibration during starting and stopping. Also many of such devices are noisy and impart undesirable vibration to the frame of the machine in which they are employed.

In accordance with the present invention, a mechanical vibrator is provided which has all of the advantages of both types of vibrators above discussed. In addition, it is quiet in operation and the vibrating action can be almost instantly started and stopped. A balanced portion of the rotor is brought up to speed or brought to a stop while it is being rotated about its axis of dynamic balance so that no excessive vibration at critical speeds is produced. Also, the extent of the vibratory motion of the device may be easily adjusted and such adjustment is not critical.

In general, the vibrator of the present invention includes a rotor which has a balanced portion and also an unbalanced portion which can be disconnected from the balanced portion. The balanced portion of the rotor has an axis of dynamic balance and is supported for rotation about such axis relative to a bearing structure. The unbalanced portion of the rotor is also rotated about such axis relative to the bearing structure when connected to the balanced portion and is also independently journaled for rotation about such axis relative to the balanced portion when disconnected from the balanced portion. The bearing structure is supported in a frame or other support member for limited pivotal movement of such axis in any direction about a pivotal point in such axis thereof. The rotor is thus subject to gyroscopic forces but the mounting of the bearing structure in the support member is such that frictional forces tend to reduce precession of the motor to zero. The unbalanced portion of the rotor is connected to a vibrated member at a position spaced axially of the rotor from the pivotal point referred to. Such connection is eccentric with respect to the actual axis of rotation of the rotor during operation of the gyratory vibrator with the two portions of the rotor connected together, such that the vibrating member is given a reciprocatory motion. Such actual axis of rotation of the rotor will, in general, be different from the axis of dynamic balance of the balanced portion of the rotor because of the unbalanced portion of the rotor connected to the balanced portion.

The eccentric connection referred to results in reciprocatory reaction forces from the vibrated member being applied to the rotor through such connection. Such forces are those resulting from acceleration of the mass of the vibrated member and the resilient reaction of its resilient mounting. The driving forces balancing such reaction forces result from angular acceleration of the mass of the rotor and its bearing structure about a second axis through the pivotal point, above referred to, and extending at right angles to the axis of rotation of the rotor and also to gyroscopic forces caused by the resulting angular movement of the rotor about a third axis extending through such point at right angles to both the previously mentioned axes.

In the specific embodiment disclosed, the balanced portion of the rotor includes a circular weight mounted on a sleeve extending concentrically therefrom. The sleeve is journaled in a bearing member so that the balanced portion of the rotor, when disconnected from the unbalanced portion, is rotated about a vertical axis which is an axis of dynamic balance or an axis of symmetry of the mass of the weight. Such axis of dynamic balance coincides with the central axis of the sleeve and weight carried thereby. The unbalanced portion of the rotor is journaled in such sleeve for rotation about such central axis and a releasable clutch is provided between the balanced and unbalanced portions of the rotor. The bearing member is flexibly mounted in a frame for the vibrator by means of a flexible diaphragm extending generally normal to the central axis referred to and connected between the bearing means and the frame so that the bearing means and rotor can have limited pivotal motion about a pivotal point in such axis. The mounting is such that the vibrator is in stable equilibrium in that the action of the diaphragm on the bearing member and parts carried thereby tends to return the central axis of the rotor to its vertical position if displaced therefrom about the pivotal point referred to.

A connecting rod has one end rotatably connected to the unbalanced portion of the rotor at a position spaced from the pivotal point referred to and extends generally at right angles to the central axis of the balanced portion of the rotor. Such connection is eccentric to the actual axis of rotation of the rotor when the two parts thereof are connected together so that rotation of the rotor causes reciprocatory motion of such connecting rod. The other end of the connecting rod is connected to the resiliently mounted vibrated member to cause vibration thereof. The eccentricity of the connection of the connecting rod to the unbalanced portion of the rotor is adjustable to enable adjustment of the amplitude of such vibration. Releasing the clutch referred to above disconnects the unbalanced portion of the rotor from the balanced portion and engaging the clutch reconnects such portions to cause vibrating motion of the vibrated member. When the clutch is disconnected, a brake is applied to the unbalanced portion. This enables the vibrating motion to be rapidly started and stopped and also enables the balanced portion of the rotor to be brought up to speed before starting the vibratory action of the vibrated member. Thus such portion of the rotor can be carried through the critical speed while in dynamically balanced condition and the unbalanced portion then rapidly carried through any such critical speed.

An object of the invention is therefore to provide an improved vibrator and vibratory device including such vibrator.

Another object of the invention is to provide a mechanical vibrator in which a rotor is supported for pivotal motion in any direction about a pivotal point in its axis of rotation and is eccentrically connected with respect to such axis of rotation to a vibrating member at a position spaced from such point so as to produce vibration of the vibrating member.

Another object of the invention is to provide a mechanical vibrator in which reaction forces from the device being vibrated are balanced by forces resulting from angular acceleration of the mass of a rotating weight and in which the weight may be brought up to speed while in balanced condition.

A further object of the invention is to provide a vibratory device in which a vibrated feed member is driven by an eccentric connection to a rapidly rotating weight mounted for gyratory pivotal movement about a point axially spaced from such eccentric connection.

Other objects and advantages of the invention will appear in the following detailed description of a preferred embodiment thereof shown in the attached drawings, of which:

FIG. 1 is a side elevation of a vibratory feeding device of the present invention including a gyratory vibrator and with parts broken away to show the structure of a vibrated member;

FIG. 2 is a fragmentary plan view on an enlarged scale of the gyratory vibrator of FIG. 1;

FIG. 3 is a vertical section through the gyratory vibrator of FIG. 2 taken on the line 3—3 of such figure including a vertical section through the connection of the connecting rod to the vibrated member;

FIG. 4 is a horizontal fragmentary section taken on the line 4—4 of FIG. 1; and

FIG. 5 is a fragmentary vertical section through a modified brake structure applicable to the vibrator of FIGS. 1 to 3.

Referring more particularly to the drawings, a vibrating feeding device is shown in FIG. 1 as having a frame 10 upon which is mounted a vibrated member 12 in the form of a conveyor element. The vibrated member 12 is supported on the frame 10 by flexible support elements 14 at each end of the frame 10. Such flexible support elements 14 may be of spring metal but are preferably plates of a reinforced synthetic resin, such as epoxy resin reinforced with glass fibers. The vibrated member 12 includes a table portion 16 having an upper feeding surface 18 and preferably has upwardly extending side portions 20 for preventing discharge of the conveyed material 22 from the surface 18 except over the discharge end 23.

The flexible support elements 14 are, in general, parallel to each other and are positioned at a small angle to the dotted line indicated at 24 which is perpendicular to the surface 22. It will be apparent that the member 12 may have limited vibratory motion relative to the base 10 and that such motion will have a component parallel to the surface 18 and a smaller component perpendicular to such surface. Vibratory movement of the feeding member 12 will thus cause material to advance along surface 18 in a direction to the right in FIG. 1, as is well known in the vibratory conveyor art. This is true even though the surface 18 may incline upwardly toward the discharge end 23, as is shown in FIG. 1.

The vibratory feeding device of FIG. 1 also includes a gyratory vibrator 26 driven from any suitable source of power, such as an electric motor 28, through flexible drive means, such as a belt 30. The gyratory vibrator includes a bearing member 32 in the form of a sleeve having a flange 34 at one of its ends secured to the inner periphery of an annular flexible diaphragm 36 which in turn has its outer edge suitably secured to the frame 10. The annular flexible diaphragm 36 thus allows the bearing member 32 to have limited pivotal motion in any direction about a point 37 which is approximately in the central axis of the bearing member 32 and in the plane of the flexible diaphragm 36. Such flexible diaphragm may be made of any suitable material, such as epoxy resin reinforced with glass fiber.

The bearing member 32 has the balanced portion 38 of a rotor including a weight carrying member 39 journaled therein by spaced antifriction bearing 40 for rotation about the central axis of the bearing member. The weight carrying member 39 is in the form of a sleeve concentric with the sleeve 32 and extends from both ends of the sleeve 32. Such balanced portion of the rotor also includes a weight 42 secured to one of such ends of the weight carrying member and, as shown in FIG. 2, the weight 42 is circular and is concentrically mounted upon the weight carrying member 39 so that the axis of rotation of the weight carrying member with respect to the bearing member 32 passes through the axis of dynamic balance of the weight 42. The weight carrying member 39 has its other end extending through an aperture 44 in the frame 10 and has a pulley 46, also forming part of the balanced portion 38 of the rotor, secured to its lower end for receiving the belt 30. Such portion of the rotor is dynamically balanced about the axis of the bearings 40 and such axis passes through the point 37.

The balanced portion 38 of the rotor has an unbalanced portion 47 including a shaft 48 journalled in the interior of the weight carrying member 39 by spaced antifriction bearings 50 for rotation relative to such sleeve about an axis coincident with the axis of the bearings 40 and through the point 37. The unbalanced portion 47 of the rotor also includes a clutch disc 52 secured to one end of such shaft adjacent the weight 42. The clutch disc 52 has a friction facing 54 secured thereto and such facing is positioned to have its exposed surface engage a surface 54 of the weight 42 so that such surface 54 constitutes a friction surface forming part of a friction clutch provided by such shaft 48 and clutch disc 52. The shaft 48 is urged axially in a direction to engage the friction facing of the clutch disc 52 with the surface 54 by means of a compression spring 56 positioned between the inner race of one of the bearings 50 and a collar 58 on such shaft. It will be apparent that the spring engages the clutch referred to and that motion of the shaft 48 in a direction to compress the spring will disengage such clutch.

A manual clutch disengaging device is shown in FIGS. 1 and 3, and such device includes a lever 60 pivoted at 62 to the frame 10. The lever has a manually actuatable handle 64 protruding through a slot 66 in a side of the frame 10. The end of the lever 66 opposite the handle has a clutch disengaging element 68 positioned to contact a disc 70 secured to the end of the shaft 48 opposite the clutch disc 52. It will be apparent that actuation of the lever 60 to raise the clutch disengaging element 68 will cause such element to engage the disc 70 of the shaft 48 and move the shaft 48 axially against the force of the spring 56 so as to release the clutch disc 52 from the weight 42 and disengage the clutch. The clutch disengaging element 68 preferably has a friction facing 72 thereon positioned to engage the disc 70 so as to act as a brake and stop rotation of the unbalanced portion 47 of the rotor when the clutch is disengaged.

The unbalanced portion of the rotor includes an adjustable disc 76 secured to the external surface of the clutch disc 52, such disc 76 being secured to the disc for pivotal adjustment about a bolt 78 extending through an aperture in the disc 76 and screw-threaded into the clutch disc 52. Diametrically opposite the bolt 78, the disc 76 is provided with an arcuate slot 80 which receives another bolt 82 also screw-threaded into the clutch disc 52. The disc 76 may thereby be adjusted between a position in which the disc 76 is concentric with the disc 52 and with the axis of the bearings 40 and 50 and a position of eccentricity with respect to such axis and disc 52 in either direction about the bolt 78 as a pivot. The disc 76 may be held in adjusted position on the disc 52 by tightening the bolts 78 and 82. The adjustable disc 76 has a bearing member 84 secured thereto upon which one end of a connecting rod 86 is journalled by an antifriction bearing 88 of the self-aligning type so that such end of the connecting rod may have limited pivotal motion about an axis perpendicular to the axis of the bearing 88 and to the rod 86 and also have relative rotation with respect to the bearing member 84. In the central or concentric position of the disc 76 with respect to the clutch disc 52, the bearing 88 is concentric with the axis of rotation of the shaft 48 and of the weight 42 and weight supporting sleeve 38 with respect to the bearing member 32. By adjusting the disc 76 to a position of eccentricity with respect to the disc 52 by pivoting it about the bolt 78, the eccentricity of the bearing 88 with respect to the balanced portion of the rotor can be adjusted. With any such eccentric adjustment of the disc 76 and bearing 88, it is not possible to completely balance the mass of the connecting rod because of its combined rotary and reciprocatory motion and, in general, any eccentric adjustment of the disc 76 will unbalance the rotor itself.

The other end of the connecting rod 86 is connected to the vibrated member 12 by a flexible connection including a pair of resilient washers 90 and 92 surrounding such end of the connecting rod 86 and bearing against opposite sides of a bracket member 94 secured to the vibrated member 12. The washers 92 and 90 are held in engagement with the bracket 94 by means of nuts 98 screw-threaded on the connecting rod 86. It will be apparent that the flexible connection provided by the resilient washers 90 and 92 enable limited pivotal motion of the connecting rod 86 with respect to the bracket 94 in any direction.

In operation of the device of FIGS. 1 to 4, the clutch disc 52 is held out of engagement with the weight 42 by the lever 60 when the motor 28 is being started or stopped. The balanced portion of the rotor including the weight 42, weight carrying sleeve 39 and pulley 46, is thus brought up to speed or to a stop while disconnected from the unbalanced portion. The rotor will ordinarily be driven above its critical speed so that it tends to rotate about an axis through the center of gravity of the rotor. By carefully dynamically balancing the balanced portion of such rotor, the axis through the center of gravity coincides with the axis of the bearings 40 and practically no vibration occurs either above or below such critical speed or at such critical speed when the clutch including the disc 52 and weight 42 is released. In its central position of adjustment, the disc 76 and bearing member 84 are also preferably in balance about the axis of the bearings 40. For the preferred type of vibratory operation, however, the adjustable disc 76 is not in its concentric position but is adjusted so that it is somewhat eccentric to the disc 52 as shown, for example, in FIG. 2 in which the radial arrow 100 extends from the axis of the bearings 40 and 50, which is the axis of dynamic balance of the balanced portion 38 of the rotor and the radial arrow 102 extends from the central axis of the bearing 88 and disc 76. This means that the rotating mass is unbalanced when the two parts of the rotor are clutched together. Under these conditions and with the rotor rotating above its critical speed, the rotor will actually rotate about an axis through its center of gravity. Such axis still goes through the point 37 and is between the two axes just discussed, but close to the central axis of the balanced portion of the rotor. This merely means that the bearing sleeve 32 gyrates slightly about the point 37 above referred to without imparting any substantial amount of vibration to the frame 10.

The actual eccentricity of the bearing 88 is thus its eccentricity with respect to the actual axis of rotation of the rotor and such eccentricity of the bearing 88 results in reciprocatory forces being applied to the rotor due to the reciprocatory acceleration and deceleration of the mass of such connecting rod and also of any mass connected thereto, such as that of the vibrated member 12 and its contents, and also due to the resilient deformation of the support elements 14. Such forces are, however, balanced by inertia forces produced by the acceleration and deceleration of the mass of the rotor and supporting bearing member. Such forces result from angular acceleration of the total mass of the rotor and its supporting bearing structure about an axis through the point 37 and perpendicular to the axis of the rotor and also gyroscopic forces resulting from resulting angular movement of the rapidly rotating rotor about a third axis through the point 37 and perpendicular to both axes just mentioned. That is to say, the bearing member 32 oscillates a small amount about the point 37, such oscillation being just sufficient to produce inertia forces balancing the forces applied thereto through the connecting rod 86 and rotor. Very little vibration is transmitted to the frame 10 through the flexible diaphragm 36 and also very little vibration is transmitted to the frame 10 through the flexible support members 14 for the feeding member 12. The drive pulley 46 is relatively close to the pivotal or gyratory point 37 so that a slight oscillatory movement of the pulley 46 is easily absorbed by the flexible belt 30 and very little vibration reaches the frames through such belt and motor 28.

Actuation of the lever 66 by means of the handle 64 causes the clutch disengaging element 68 to engage the disc 70 on the shaft 48 to move such shaft axially and thereby releases the clutch disc 52 from the surface of the weight 42. The element 68 acts as a brake to stop the unbalanced portion 47 of the rotor including the shaft 48, disc 76 and bearing 88 secured thereto so that the vibratory motion of the vibrated member 12 connected to the vibrator 26 is rapidly stopped. Release of the lever 60 again causes engagement of the clutch disc 52 with the weight 42 by action of the spring 56 to rapidly start the vibratory action again.

In FIG. 2, the disc 76 and bearing member 84 is shown as being adjusted in a clockwise direction from its central position around the bolt 78 as indicated by the arrow, while the direction of rotation of the rotor is indicated by the arrow 106. This is the preferred direction of rotation for the direction of adjustment of the disc 76 shown in the drawing. For opposite rotation of the rotor, the eccentric adjustment of the disc 76 should be counterclockwise. The device operates more smoothly with the direction of adjustments just described for the directions of rotation also just described than is the case with opposite directions of adjustment.

When the rotor is being rapidly rotated, the vibrator device, shown in FIGS. 1 to 3, tends to seek a position of zero gyroscopic precession since resilient forces due to deformation of the diaphragm 36 tend to return the rotor to the position shown. That is to say, the vibrator is in a position of stable equilibrium so far as such forces are concerned and any frictional losses in the suspension including the diaphragm 36 tend to damp out any gyroscopic precession due to any angular displacement of the axis of the rotor about the point 37 as a center. The opposite would be true if the vibrator were suspended in unstable equilibrium, for example, if the entire device of FIG. 3 were tipped a substantial angle from the position shown in which the axis of the bearing member 32 is vertical. The rotor would be in stable equilibrium if the vibrator 32 were inverted so that the axis of the rotor is again vertical.

As discussed above, the angular acceleration of the mass of the bearing member 32 as well as the mass of the rotor about an axis perpendicular to the axis of rotation of the rotor and through the point 37 produces forces balancing those applied through the connecting rod. That is to say, the mass of the bearing member 32 can be increased and that of the rotor decreased and an effective vibrator produced. This would reduce the balancing forces due to the gyroscopic effect and increase the balancing forces due to angular acceleration of a mass about such perpendicular axis. It has the disadvantage that the bearings 40 are subjected to greater stresses.

There is another possible operation of the device of FIGS. 1 to 3. If the mass of the rotor is concentrated to a greater extent in the unbalanced portion 47 of the rotor and distributed so that such portion is unbalanced with the bearing 88 in axial alignment with the axis of the bearings 40, the vibrator will still operate since the actual axis of rotation of the rotor will be through the center of gravity of the rotor and the axis of the bearing 84 will be eccentric thereto. This manner of operation has the disadvantages that a much greater mass must be started and stopped by the clutch for the unbalanced portion of the rotor and that the bearing member 32 will have increased gyratory motion. In any device involving an unbalanced portion of a rotor, the center of gravity of such unbalanced portion should be spaced axially from the pivotal point 37 of the axis of the rotor to enable the rotor to rotate about an axis through its center of gravity and reduce reaction forces transmitted to the frame of the device.

A modified clutch and brake operating structure is shown in FIG. 5 in which a casing 108 is shown as being attached rigidly to the bearing member 32 so as to extend axially from such bearing member in a direction opposite from the weight 42 of FIG. 3. The casing has a slot 110 therein through which the belt 30 reaches the pulley 46 and contains a magnetic solenoid device 112 including a core 114 and winding 116. The solenoid device also contains a plunger 118 which moves upwardly when the winding 116 is energized from any suitable source of electric power (not shown) to force the disc 120 having a friction facing 122 thereon into engagement with the disc 70 to release the clutch of FIG. 3 and brake the unbalanced portion of the rotor. The vibrator can thus be operated by remote control and furthermore, the casing 108 and solenoid 112 can function as a counterweight for the vibrator 26 of FIGS. 1 to 3, so that it will be in stable equilibrium in any position and will operate with the axis of the bearing member 32 extending in any desired direction. It will be appreciated that such counterweight adds mass to the gyratory portion of the vibrator so as to reduce the gyratory motion of the bearing member 32 in any of the types of operation above described.

The gyratory vibrator of the present invention can be made in substantially any size from very small devices to very large devices and it is therefore usable for vibrating the feeding member of packaging machines, such as for potato chips, berries and other food products, or may be of larger size for vibrating such components as large vibrating conveyor screens, etc. In any case, substantially all of the variable reaction forces due to such vibration are balanced by the forces resulting from accelerating masses forming part of the vibrator itself so that very little of such reaction forces are transmitted to the frame of the device.

While we have described the preferred embodiment of our invention, it is understood that the details thereof may be varied and that the scope of the invention is to be determined by the following claims.

We claim:
1. A gyratory vibrator comprising a rotor having an axis of rotation, journal means for supporting said rotor for rotation about said axis and also for pivotal motion of said axis in any direction about a point at one axial position only along said axis, a member relatively rotatively connected to said rotor eccentrically of said axis at a position spaced axially of said rotor from said point, said member being supported for reciprocatory motion in a direction generally at right angles to said axis, and means for rotating said rotor to cause said reciprocatory motion, said rotor being otherwise free of restraint which will prevent said pivotal motion of said axis about said point from being of substantial amplitude.

2. A gyratory vibrator comprising a rotor having an axis of rotation through its center of gravity, journal means for rotatively supporting said rotor means for supporting said journal means for pivotal motion of said axis in any direction about a point at one axial position only along said axis, a member relatively rotatively connected to said rotor eccentrically of said axis at a position spaced axially of said rotor from said point, said element being supported for reciprocatory motion in a direction generally at right angles to said axis, and means for rotating said rotor to cause said reciprocatory motion, said rotor being otherwise free of restraint which will prevent said pivotal motion of said axis about said point from being of substantial amplitude.

3. A gyratory vibrator comprising a rotor having a central axis displaced from its center of gravity, journal means for supporting said rotor for rotation about said axis relative to said journal means, means for supporting said journal means for pivotal motion of said axis in any direction about a point at one axial position only along said axis, said point being spaced axially of said rotor from said center of gravity to enable said rotor to have an axis of rotation through said center of gravity, a member relatively rotatively connected to said rotor eccentrically of said axis of rotation at a position spaced axially of said rotor from said point, said member being supported for reciprocatory motion in a direction generally at right angles to said axis, and means for rotating said rotor to cause said reciprocatory motion, said rotor being otherwise free of restraint which will prevent said pivotal motion of said axis about said point from being of substantial amplitude.

4. A gyratory vibrator comprising a rotor including a weight having an axis of dynamic balance, journal means for mounting said rotor for rotation about said axis relative to said journal means, flexible support means for supporting said journal means for limited pivotal motion of said axis in any direction about a point at one axial position only along said axis, a connecting rod extending generally at right angles to said axis for connection to a device to be vibrated, said connecting rod having one end relatively rotatively connected to said rotor eccentrically of said axis at a position spaced axially of said rotor from said point, and means for rotating said rotor to cause reciprocatory motion of said connecting rod, said rotor being otherwise free of restraint which will prevent said pivotal motion of said axis about said point from being of substantial amplitude.

5. A gyratory vibrator comprising a rotor including a weighted balanced portion having an axis of dynamic balance and an unbalanced portion having a center of gravity displaced from said axis, journal means for mounting said rotor for rotation about said axis relative to said journal means, flexible support means for supporting said journal means for limited pivotal motion of said axis in any direction about a point at one axial position only along said axis, said point being spaced axially of said rotor from said center of gravity of said unbalanced portion to provide an axis of rotating of said rotor extending through the center of gravity of said rotor and through said point, a connecting rod extending generally at right angles to said axis for connection to a device to be vibrated, said connecting rod having one end relatively rotatively connected to said unbalanced portion eccentrically of said axis of rotation of said rotor, and means for rotating said rotor to cause reciprocatory motion of said connecting rod, said rotor being otherwise free of restraint which will prevent said pivotal motion of said axis about said point from being of substantial amplitude.

6. A gyratory vibrator comprising a rotor including a weighted balanced portion having a central axis of dynamic balance, journal means for supporting said rotor for rotation about said axis relative to said journal means and also for pivotal motion of said axis in any direction about a point at one axial position only along said axis, a member carried by said balanced portion and supported for rotation relative to said balanced portion about said axis, clutch means between said balanced portion and said member, a member relatively rotatable connected to said member eccentrically of said axis at a position spaced axially of said rotor from said point, said member being supported for reciprocatory motion in a direction generally at right angles to said axis, means for rotating said rotor, and means for engaging said clutch means to cause said reciprocatory motion.

7. A gyratory vibrator comprising a rotor including a weighted balanced portion having a central axis of dynamic balance, journal means for supporting said rotor for rotation about said axis relative to said journal means and also for pivotal motion of said axis in any direction about a point at one axial position only along said axis, said rotor having an unbalanced portion supported for rotation relative to said balanced portion about said axis, clutch means between said balanced portion and said unbalanced portion for connecting said portions together, said unbalanced portion having a center of gravity displaced from said axis and displaced axially of said rotor from said point so that said rotor has an axis of rotation extending through said point but displaced from said central axis when said portions are connected together by said clutch and said rotor is rotated above its critical speed, a member relatively rotatable connected to said unbalanced portion eccentrically of said axis of rotation at a position spaced axially of said rotor from said point, said element being supported for reciprocatory motion in a direction generally at right angles to said central axis, means for rotating said balanced portion above said critical speed, and means for engaging said clutch means to cause said reciprocatory motion.

8. A gyratory vibrator comprising a rotor including a weighted balanced portion having a central axis through its center of gravity, journal means for supporting said rotor for rotation about said axis relative to said journal means, means for supporting said journal means for pivotal motion of said axis in any direction about a point at one axial position only along said axis, a connecting element relatively rotatively connected to said rotor eccentrically of said axis at a position spaced axially of said rotor from said point, said element being supported for reciprocatory motion in a direction generally at right angles to said axis, and means to adjust the eccentricity of the connection of said connecting element to said rotor, said rotor being otherwise free of restraint which will prevent said pivotal motion of said axis about said point from being of substantial amplitude.

9. A gyratory vibrator comprising a rotor including a weighted balanced portion having a central axis through its center of gravity, journal means for supporting said rotor for rotation about said axis relative to said journal means, means for supporting said journal means for pivotal motion of said axis in any direction about a point at one axial position only along said axis, a member forming part of said rotor and supported for rotation relative to said balanced portion about said axis, clutch means between said balanced portion and said member to connect said member to said balanced portion for rotation therewith, a connecting element relatively rotatable connected to said member eccentrically of said axis at a position spaced axially of said rotor from said point, said element being supported for reciprocatory motion in a direction generally at right angles to said axis, means for rotating said rotor, and means for adjusting the eccentricity of the connection of said connecting element to said member.

10. A gyrating vibrator comprising a rotor having a centrally disposed axis, journal means for mounting said rotor for rotation about said axis relative to said journal means, a frame, a flexible diaphragm surrounding said journal means, said diaphragm extending generally in a plane normal to said axis, said diaphragm being connected between said frame and said journal means for supporting said journal means for limited pivotal motion of said axis in any direction about a point in said plane and at one axial position only along said axis, a connecting rod extending generally at right angles to said axis for connection to a device to be vibrated, said connecting rod having one end relatively rotatively connected to said rotor eccentrically of said axis at a position spaced axially of said rotor from said point, and means for rotating said rotor to cause reciprocatory motion of said connecting rod, said rotor being otherwise free of restraint which will prevent said pivotal motion of said axis about said point from being of substantial amplitude.

11. A vibrating feeder comprising a frame, a feeding member having an upper surface, supporting means between said frame and said feeding member providing for reciprocatory movement of said feeding member relative to said frame having a component of motion parallel to said surface and a smaller component normal to said surface, a gyratory vibrator carried by said frame, said vibrator including a rotor having an axis of rotation, journal means for supporting said rotor for rotation about said axis, and also for pivotal motion of said axis in any direction about a point at one axial position only along said axis, a connecting rod extending in a direction generally parallel to said surface and having one end connected to said feeding member, said connecting rod having its other end relatively rotatively connected to said rotor eccentrically of said axis at a position spaced axially of said rotor from said point, and means for rotating said rotor relative to said journal means to cause said reciprocatory movement of said feeding means, said rotor being otherwise free of restraint which will prevent said pivotal motion of said axis about said point from being of substantial amplitude.

12. A vibrating feeder comprising a frame, a feeding member having an upper surface, supporting means between said frame and said feeding member providing for reciprocatory movement of said feeding member relative to said frame having a component of motion parallel to said surface and a smaller component normal to said surface, a gyratory vibrator carried by said frame, said vibrator including a rotor including a circular weight having a concentric axis through its center of gravity, journal means for supporting said rotor for rotation about said axis relative to said journal means, means for supporting said journal means in said frame for limited pivotal motion of said axis in any direction about a point at one axial position only along said axis, a connecting rod extending in a direction generally parallel to said surface and having one end connected to said feeding member, said connecting rod having its other end relatively rotatively connected to said rotor eccentrically of said axis at a position spaced axially of said rotor from said point, and means for rotating said rotor relative to said journal means to cause said reciprocatory movement of said feeding means, said rotor being otherwise free of restraint which will prevent said pivotal motion of said axis about said point from being of substantial amplitude.

13. A vibrating feeder comprising a frame, a feeding member having an upper surface, supporting means between said frame and said feeding member providing for reciprocatory movement of said feeding member relative to said frame having a component of motion parallel to said surface and a smaller component normal to said surface, a gyratory vibrator carried by said frame, said vibrator having a rotor including a balanced portion having an axis of dynamic balance, journal means for supporting said rotor for rotation about said axis relative to said journal means, said rotor having an unbalanced portion supported for rotation relative to said balanced portion about said axis and clutch means to connect said portions together for rotation about said axis relative to said journal means, means for supporting said journal means in said frame for limited pivotal motion of said axis in any direction about a point at one axial location only along said axis and spaced axially of said rotor from the center of gravity of said unbalanced portion and with said axis extending generally in a direction normal to said surface, a connecting rod extending in a direction generally parallel to said surface and having one end connected to said feeding member, said connecting rod having its other end relatively rotatively connected to said unbalanced portion eccentrically of said axis at a position spaced axially of said rotor from said point, and means for rotating said rotor relative to said journal means to cause said reciprocatory movement of said feeding means.

References Cited in the file of this patent

UNITED STATES PATENTS

| | | |
|---|---|---|
| 1,197,133 | Lawry | Sept. 5, 1916 |
| 1,997,392 | Piper | Apr. 9, 1935 |
| 2,515,799 | Rouy | July 18, 1950 |
| 2,534,738 | Scott | Dec. 19, 1950 |
| 2,677,967 | Galbraith | May 11, 1954 |
| 2,728,237 | Galbraith | Dec. 27, 1955 |